No. 771,618. PATENTED OCT. 4, 1904.
M. C. ELLISON.
FILLED SACK SEWING MACHINE.
APPLICATION FILED JAN. 17, 1903.
NO MODEL. 4 SHEETS—SHEET 3.
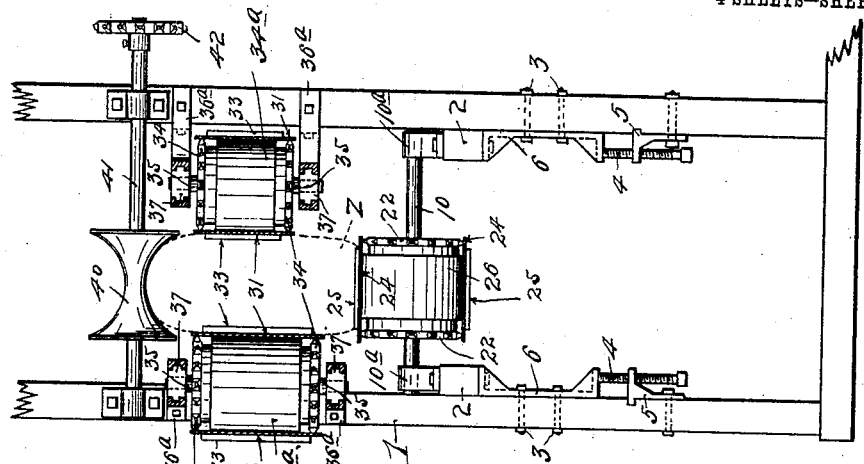
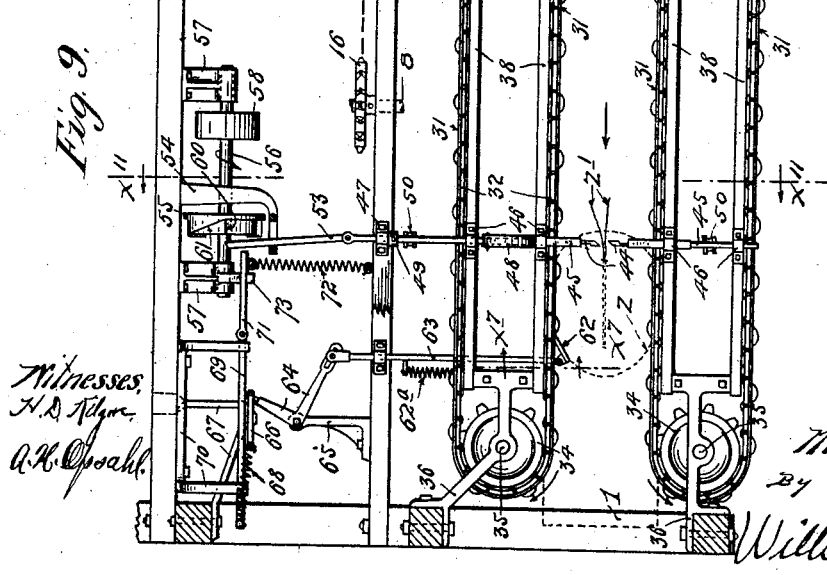

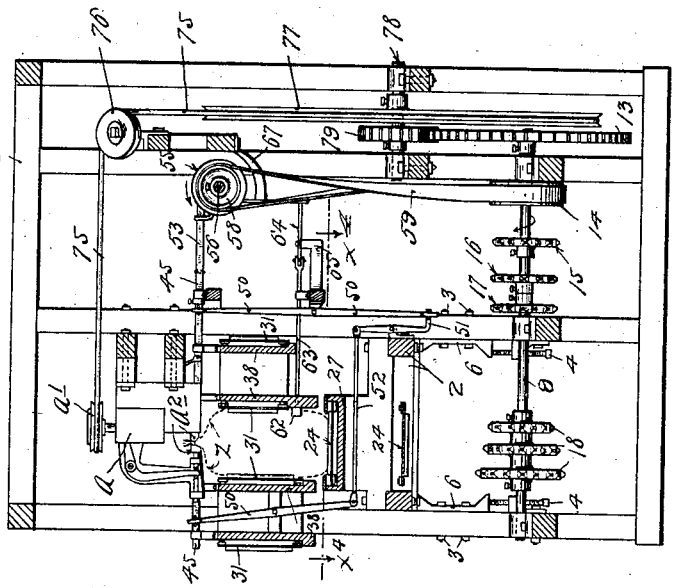

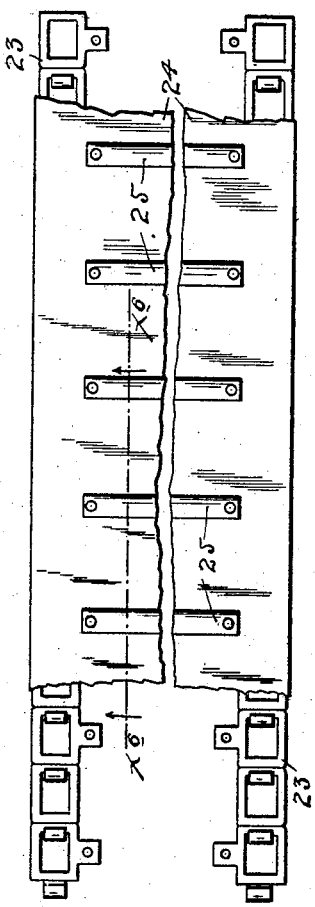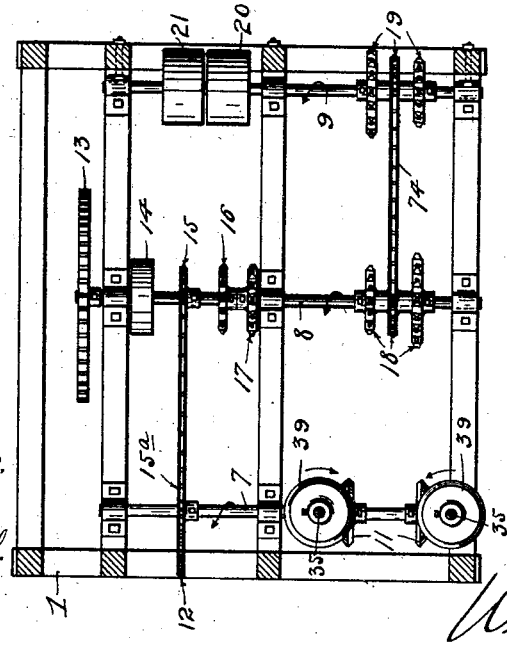

No. 771,618. PATENTED OCT. 4, 1904.
M. C. ELLISON.
FILLED SACK SEWING MACHINE.
APPLICATION FILED JAN. 17, 1903.
NO MODEL. 4 SHEETS—SHEET 4.
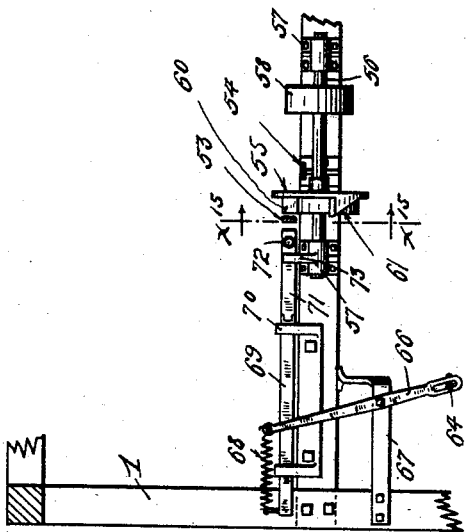
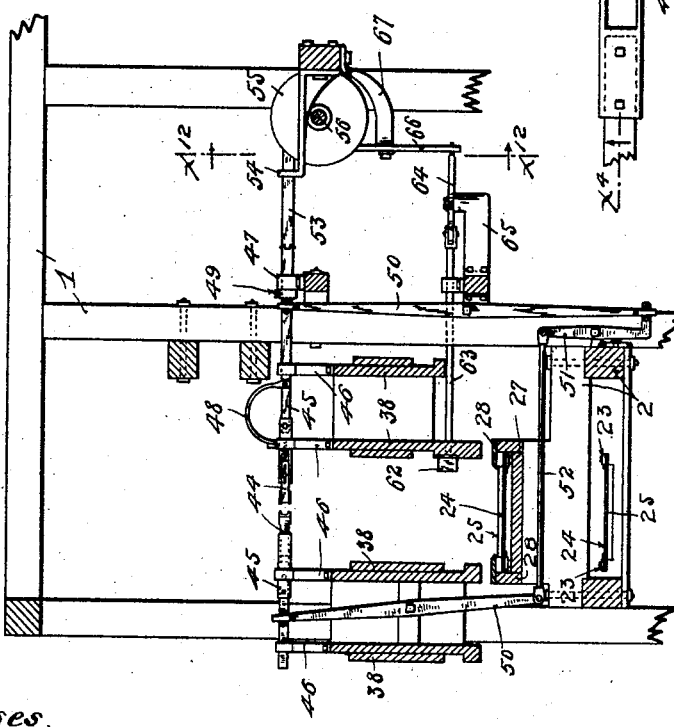
Witnesses.
H. D. Kilgore
A. H. Opsahl.
Inventor:
Milton C. Ellison.
By his Attorneys.
Williamson & Merchant No. 771,618. Patented October 4, 1904.

UNITED STATES PATENT OFFICE.

MILTON CURTIS ELLISON, OF ST. PAUL, MINNESOTA.

FILLED-SACK-SEWING MACHINE.

SPECIFICATION forming part of Letters Patent No. 771,618, dated October 4, 1904.

Application filed January 17, 1903. Serial No. 139,871. (No model.)

*To all whom it may concern:*

Be it known that I, MILTON CURTIS ELLISON, a citizen of the United States, residing in St. Paul, in the county of Ramsey and State of Minnesota, have invented a new and useful Filled-Sack-Sewing Machine, for which I ask that Letters Patent be granted to me, as set forth in the annexed specification and drawings.

My present invention relates to filled-sack-sewing machines, and is particularly directed to the provision of approved means for feeding the filled sacks to the sewing mechanism, and, further, to the provision of improved means for automatically cutting the thread.

To the above ends the invention consists of the novel devices and combinations of devices hereinafter described, and defined in the claims.

The invention is illustrated in the accompanying drawings, wherein like characters indicate like parts throughout the several views.

Figure 1 is a view in side elevation, showing the complete machine. Fig. 2 is a transverse vertical section on the line $x^2 x^2$ of Fig. 1. Fig. 3 is a horizontal section taken on the line $x^3 x^3$ of Fig. 1. Fig. 4 is a detail in horizontal section on the line $x^4 x^4$ of Figs. 1 and 2, some parts being broken away. Fig. 5 is a view in plan with some parts broken away, showing in detail the lower or bottom member of the three endless feed-belts of the sack-feeding device. Fig. 6 is a detail in section on the line $x^6 x^6$ of Fig. 5. Fig. 7 is a detail in section approximately on the line $x^7 x^7$ of Fig. 9. Fig. 8 is a horizontal section on the line $x^8 x^8$ of Fig. 7. Fig. 9 is a horizontal section on the line $x^9 x^9$ of Fig. 1, the parts being shown on a somewhat enlarged scale and the lower belt of the sack-feeding device being indicated by dotted lines. Fig. 10 is a transverse vertical section on the irregular line $x^{10} x^{10}$ of Fig. 1, the sack being indicated by dotted lines. Fig. 11 is a transverse vertical section with some parts broken away and with others removed, taken on the line $x^{11} x^{11}$ of Fig. 9. Fig. 12 is a vertical section showing a portion of the machine, taken on the line $x^{12} x^{12}$ of Fig. 11. Fig. 13 is a detail in side elevation, showing the thread-cutting knives and their holders. Fig. 14 is a section on the line $x^{14} x^{14}$ of Fig. 13. Fig. 15 is a detail in section on line $x^{15} x^{15}$ of Fig. 12, showing the actuating-wheel of the thread-cutter. Fig. 16 shows the said actuating-wheel in side elevation.

All of the parts of the machine are supported by a skeleton framework 1, which at one side has an adjustable horizontally-disposed section 2. The said section 2, as shown, is rigidly clamped to the main frame 1 by bolts 3, but is adapted to be vertically adjusted by set-screws 4, which work through brackets 5 on said frame 1 and impinge on depending legs 6 of the said frame-section 2. Counter-shafts 7, 8, and 9 are journaled in suitable bearings on the lower portion of the frame 1, while counter-shafts 10 are mounted in suitable bearings on the adjustable frame-section 2. As shown, one of the shafts 10 is mounted in adjustable bearings $10^a$ on the said frame 2. The counter-shaft 7 carries a pair of beveled gears 11 and a sprocket 12. The counter-shaft 8 carries a large spur-gear 13, a pulley 14, and sprockets 15, 16, 17, and 18. The counter-shaft 9 carries sprocket-wheels 19 and is provided with a fixed driving-pulley 20 and a looser idle pulley 21.

The sewing-machine proper—that is, the stitching mechanism—is indicated as an entirety by the character $a$, and of the parts thereof it is desirable for the purposes of this case to further note only the driven sheave or pulley $a'$ on its operating-shaft and guides $a^2$, between which the gathered upper end of the sack is passed in the stitching operation. This sewing mechanism may be of any desired or well-known construction.

The two shafts 10, which are mounted in the frame-section 2, are provided with pairs of sprockets 22, over which run sprocket-chains 23, to which is secured a wide flexible belt 24. On its outer face the belt 24 is provided with transverse cleats 25, which not only stiffen the belt laterally, but give the same more positive feeding action on the sack. The intermediate portion of the belt 24 runs over roller-sections 26, secured on the shafts 10 between the sprockets 22, as best shown in Figs. 4 and 10. The upper portion of the belt 24 and the upper portions of the sprocket-chains 23 run over a skid or horizontal support 27, which extends between the drum-sections 26 and is rigidly secured to the adjustable frame-section 2. The sides of the skid 27 rise above the chains 23 and are provided with guide-strips 28, which guide-strips project inward over the said chains and over the edge of the belt 24 and are beveled on the inner edges for a purpose which will hereinafter appear. One of the counter-shafts 10 (see Fig. 4) is provided with a large sprocket 29, over which and the sprocket 17 on the counter-shaft 8 runs a sprocket-chain 30. (Indicated by dotted lines in Fig. 4 and by full lines in Fig. 1.) A sprocket-chain $15^a$ runs over the sprockets 15 and 12 to impart motion from the shaft 8 to the shaft 7.

For coöperation with the bottom feed-belt 24 described there is a pair of laterally-spaced side belts set edgewise in a vertical direction and arranged to engage the side of the filled sack. These endless side belts 31, like the belt 24, are secured to sprocket-chains 32 and are provided with cleats 33 on their outer faces for an important purpose hereinafter to be stated. The sprocket-chains 32 run over the sprockets 34 of vertically-disposed shafts 35, mounted on suitable bearings 36 and $36^a$ on the main frame 1. On the shafts 35, between the sprockets 34, are roller-sections $34^a$, over which run the belts 31. As shown, the two shafts at the right with respect to Figs. 1 and 9 are directly mounted in adjustable bearing-blocks 37, which in turn are seated in the bearings $36^a$ and are subject to adjusting-screws $37^a$. The endless belts 31 and the chains 32 run against guide-boards or backing-strips 38, which are rigidly secured at their ends to the bearing-brackets 36 and $36^a$, as best shown in Fig. 9. The two vertical shafts 35 at the left with respect to Figs. 1, 3, and 9 extend downward into suitable bearings on the main frame 1 and are provided with beveled gears 39, that mesh with the bevel-gears 11 of the counter-shaft 7.

In the drawings the filled sack, which by the three coöperating feed-belts 24, 31, and 31 are fed to the stitching mechanism, is indicated by the character Z, said sack being indicated by dotted lines in Figs. 2, 9, and 10. While the sacks are held by the said three belts and are being fed forward to the stitching mechanism their upper ends are engaged and pressed down to a predetermined height by a concave pressing-roller 40, carried by a horizontally-disposed shaft 41, having at one end a sprocket 42. A sprocket-chain 43 runs over the sprocket 42 and over the sprocket 16 of the counter-shaft 8.

In Fig. 9 the threads, which extend from the sewed sack Z to the stitching mechanism, are indicated by dotted lines, (marked $z'$,) and these threads are adapted to be cut at the proper time by the shearing action of a pair of reversely-movable chisel-like knives 44, which are carried by holders 45, which holders are of plunger-like form and are mounted to work through bearings 46, shown as secured on the upper edges of the guide-boards 38 hereinbefore described. Said knives and their holders are shown in detail in Figs. 13 and 14, by reference to which it will be noted that the sharpened edges of said knives are beveled in the same direction and are provided at their side edges with reversely-projecting flanges $44^a$. The ends of the flanges $44^a$ are cut off in line with the beveled edges of the said knives, so that when the knives are forced together the said flanges engage in advance and insure the lapping over of the said knives. To permit this overlapping action of the knives, they must of course be made somewhat flexible. The knives are preferably made adjustable in their respective holders, and hence are, as shown, made subject to set-screws $45^a$, which are screwed through webs of the said holders, as best shown in Figs. 13 and 14. The innermost holder 45 is longer than the outer holder and besides working through the bearings 46 works also through a bearing 47 on the main frame 1 and is yieldingly pressed into a retracted position, or toward the right with respect to Fig. 11, by means of a quite strong bow-spring 48, one end of which, as shown, is attached to said holder and the other end to one of the bearings 46. The movement of said holder toward the right is, as shown, limited by a collar 49 on the said holder, which normally engages the said bearing 47. The two holders 45 are connected for reverse movement by means of a pair of levers 50, an intermediate lever 51, and a connecting-rod 22, which parts are preferably arranged as best shown in Fig. 11. The projecting end of the innermost holder 45 has attached to it a pivoted finger 53, which works endwise and laterally in a suitable seat forming a bracket 54 on the main frame 1, as best shown in Figs. 9 and 11. The free end of the pivoted finger 53 is operated upon by a rotating wheel or disk 55, which is carried by a counter-shaft 56, journaled in bearings 57 on the main frame and, as shown, provided with a pulley 58. A belt 59 runs over the pulley 58 and over the pulley 14 of the counter-shaft 8 to transmit motion from said shaft 8 to said shaft 56. The actuating-wheel 55 is formed on one face with radiating driving-lugs 60 and radially outwardly therefrom with cam-surfaces 61, which lugs and cam-surfaces operate on the free end of the finger 53 in a manner which will appear in the description of the operation.

As one feature of this invention a thread-cutter is tripped into action by a trip which is arranged to be directly engaged by the body of the filled sack. This trip is preferably in the form of a hinged plate 62, which normally projects into the path of movement of the filled sack, the same being, as shown in Figs. 2, 7, 8, 9, and 11, hinged to one of the inner guide-boards 38. A rod 63 connects the free edge of the tripping-plate 62 to one arm of the bell-crank 64, pivoted to a bracket 65 on the main frame 1. The other arm of the bell-crank 64 is connected to the lower end of a lever 66, which is, as shown, pivoted to a bracket 67 on the main frame, as best shown in Fig. 12. The upper end of the lever 66 is connected by a coiled spring 68 to one end of a plunger 69, which is mounted to slide in a bearing 70 on one of the horizontal bars of the main frame. To the inner end of the plunger 69 is pivoted a trip-finger 71, which by a coiled spring 72 is normally held, as shown in Fig. 9, against a stop 73, projected from one of the bearings 57.

Motion is transmitted from the counter-shaft 9 to the counter-shaft 8 through a sprocket-chain 74, which runs over one of the sprockets 19 and over one of the sprockets 18. It will be noted that the several sprockets 18 and the several sprockets 19 are in reverse conical arrangement, so that the speed of the shaft 8 with respect to the speed of the shaft 9 may be varied by shifting the chains 74 from one to the other of the coöperating lined sprockets 18 and 19.

The sewing or stitching mechanism receives motion through a belt 75, which runs over the sheave $a'$, heretofore noted, over guide-sheaves 76, suitably mounted on the main frame 1, and over a large driving-sheave 77. The sheave 77 is secured on the short counter-shaft 78, journaled in suitable bearings on the main frame and provided with a spur-pinion 79, which meshes with the large gear 13 of the counter-shaft 8.

Operation: As already indicated, the filled sacks are held in a vertical position and fed forward to the stitching mechanism by the combined action of the three endless belts 24 and 31. The vertical cleats on the belts 31 press slightly into the sides of the sack, and thus securely hold the sack in a proper upright position. The three belts must of course move at the same rate of speed. The filled sacks are delivered by hand or otherwise to the receiving end of the feed device afforded by the three coöperating belts. The receiving end of said feed device is at the right with respect to Figs. 1, 4, and 9. The beveled guide-strips 28 serve to work the lower end of a filled sack which has not been located centrally on the supporting-belt 24 off from the said strips and entirely onto the said belts. The packing-roller 40, as already stated, presses down the top of the sack, so that its unsewed upper edge will stand at the proper height for delivery between the guide-pieces $a^2$ of the sewing mechanism and further adjusts the top of the sack so that it may be sewed close to the top of the sack-filling. Just after the filled sack has been sewed and when it reaches a position indicated approximately in Fig. 9 it is brought directly into contact with the tripping-plate 62, thereby forcing the same outward. When the tripping-plate 62 is forced outward, the plunger 69 is, through the spring 68, lever 66, bell-crank 64, and rod 63, forced toward the right with respect to Figs. 9 and 12. When the plunger 69 is forced toward the right, its finger 71 engages the finger 53 and forces the latter laterally, so that its free end stands in the path of movement of the tripping-lugs 60 of the wheel 55. When one of the lugs 60 of the said wheel engages the free end of the finger 53, it forces the same endwise and through the connections already described forces the cutting-knives 44 together and severs the threads of the sack which has just been sewed. The knives are held together only for an instant, the same being released as soon as the operating driving-lug 60 passes out of engagement with the free end of the tripping-finger 53. Just as the free end of the said finger 53 is thrown out of engagement with the said driving-lug it is engaged by one of the cam-surfaces 61 of the wheel 55 and is forced laterally toward the left out of the path of movement of the driving-lugs of the said wheel. The plunger 69 and its tripping-finger 71 will, however, be held from return movements to normal positions for some little time by the continued engagement of the filled sack with the tripping-plate 62; but the return movements of the finger 53 and of the thread-cutting knives and intermediate parts take place instantly upon the release of the finger 53 from the driving-lugs 60, which has forced the same into action. Under this return movement of the said finger 53 its free end is thrown against the free end of the finger 71 and forces the same laterally against the tension of the spring 72. When the sack has been carried past the tripping-plate, the latter is released, and the spring $62^a$ then becomes operative to throw the said tripping-plate and connected parts to normal positions. (Indicated in Fig. 9.)

It will of course be understood that the machine above described is capable of modification within the scope of my invention as herein set forth and claimed.

I claim—

1. In a machine of the character described, a feed device for the filled sacks comprising three endless feed-belts that travel at the same speed, one engaging with the bottoms of the filled sacks and sustaining the weight of the same, and the other two engaging with the sides of the filled sacks and having vertical cleats which increase the ability of said two latter feed-belts to hold said sacks in upright position, substantially as described.

2. In a machine of the character described, a feed device for the filled sacks comprising three endless feed-belts, one engageable with the bottoms of the filled sacks and sustaining the weight of the same, and the other two engageable with the sides of the filled sacks and holding the sacks in upright positions, and beveled guide-strips overlying and following closely the edges of the upper portion of the bottom member of said endless belts, substantially as described, and for the purposes set forth.

3. In a filled-sack-sewing machine, the combination with stitching mechanism and a feed device for feeding the filled sacks to said stitching mechanism, of a packing-roller operating on the tops of the filled sacks while they are being conveyed to said stitching mechanism by said feed device, said packing-roller serving to press the tops of the filled sacks so that their unsewed ends may be properly delivered to said stitching mechanism.

4. In a filled-sack-sewing machine, the combination with a stitching mechanism, of a feed device for the filled sacks comprising three endless feed-belts movable at the same speed, one engageable with the bottoms of the filled sacks and sustaining the weight of the same, and the other two engageable with the sides of the sacks and holding the same in upright positions, and a concave packing-roller located for action on the top of the sacks while they are being conveyed to said stitching mechanism by said feed device, substantially as described.

5. In a filled-sack-sewing machine, the combination with a stitching mechanism and feed device for feeding the sacks thereto, of a thread-cutter comprising an actuating-wheel, means for rotating said wheel, and a trip for rendering said actuating-wheel operative, said trip including a tripping-plate which is located in position to be directly engaged by the filled sacks, while said sacks are receiving movement from said feeding device, substantially as described.

6. In a filled-sack-sewing machine, the combination with stitching mechanism and a feed device for feeding the filled sacks thereto, of a packing device operating on the tops of the filled sacks while they are being conveyed to said stitching mechanism by said feed device, said packing device serving to press the tops of the filled sacks so that their unsewed ends may be properly delivered to said stitching mechanism.

7. In a filled-sack-sewing machine, the combination with a stitching mechanism and means for feeding the filled sacks thereto, of a thread-cutter comprising a rotating wheel having driving-lugs and cam-surfaces, coöperating knives, one of which is movable and is connected to a pivoted tripping-finger, which tripping-finger receives endwise motion from the driving-lug and is tripped laterally out of action by the cam-surface of said actuating-wheel, and a tripping plate or head located in the path of the filled sack and connected with the second tripping-finger which operates on the aforenoted tripping-finger to force the same into a position where it will be struck by the driving-lug of said actuating-wheel, substantially as described.

MILTON CURTIS ELLISON.

Witnesses:
   JOHN E. HAGLIN,
   GRANT T. ELLISON.